(12) United States Patent
Ayama et al.

(10) Patent No.: US 8,057,926 B2
(45) Date of Patent: Nov. 15, 2011

(54) PERPENDICULAR MAGNETIC RECORDING MEDIUM

(75) Inventors: Kenji Ayama, Singapore (SG);
Tokichiro Sato, Singapore (SG);
Teiichiro Umezawa, Singapore (SG);
Masafumi Ishiyama, Singapore (SG);
Junichi Horikawa, Singapore (SG)

(73) Assignee: WD Media(Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/666,561

(22) PCT Filed: Sep. 26, 2008

(86) PCT No.: PCT/JP2008/067555
§ 371 (c)(1),
(2), (4) Date: Mar. 17, 2010

(87) PCT Pub. No.: WO2009/041656
PCT Pub. Date: Apr. 2, 2009

(65) Prior Publication Data
US 2010/0209740 A1  Aug. 19, 2010

(30) Foreign Application Priority Data

| | | |
|---|---|---|
| Sep. 28, 2007 | (JP) | 2007-256911 |
| Sep. 28, 2007 | (JP) | 2007-256912 |
| Sep. 28, 2007 | (JP) | 2007-256913 |
| Mar. 28, 2008 | (JP) | 2008-088117 |
| Mar. 28, 2008 | (JP) | 2008-088118 |
| Mar. 28, 2008 | (JP) | 2008-088119 |

(51) Int. Cl.
*G11B 5/66* (2006.01)

(52) U.S. Cl. ..................................... 428/829

(58) Field of Classification Search ............... None
See application file for complete search history.

(56) References Cited

U.S. PATENT DOCUMENTS

| | | | |
|---|---|---|---|
| 2002/0136929 A1* | 9/2002 | Oikawa et al. | 428/694 TM |
| 2006/0154113 A1 | 7/2006 | Watanabe et al. | |
| 2007/0042227 A1 | 2/2007 | Iwasaki et al. | |
| 2008/0062575 A1 | 3/2008 | Shimizu | |
| 2009/0081483 A1 | 3/2009 | Sonobe et al. | |

FOREIGN PATENT DOCUMENTS

| | | |
|---|---|---|
| JP | 2005-100537 A | 4/2005 |
| JP | 2006-024346 A | 1/2006 |
| JP | 2006-164440 A | 6/2006 |
| JP | 2006-268972 A | 10/2006 |

OTHER PUBLICATIONS

T. Oikawa, et al., "Microstructure and Magnetic Properties of CoPtCr-SiO$_2$ Perpendicular Recording Media", IEEE Transactions on Magnetics, Sep. 2002, pp. 1976-1978, vol. 38, No. 5.

* cited by examiner

Primary Examiner — Holly Rickman

(57) ABSTRACT

The present invention provides a perpendicular magnetic recording medium that can reduce noise by further size reduction and isolation of magnetic grains in a magnetic recording layer and can increase the recording density by improvement of the SNR. A typical configuration of a perpendicular magnetic recording medium according to the present invention is a perpendicular magnetic recording medium having a magnetic recording layer with a granular structure in which non-magnetic grain boundary portions are formed between magnetic grains that have grown continuously in a columnar shape, wherein the grain boundary portions contain a plurality of kinds of oxides.

5 Claims, 11 Drawing Sheets

| | Total Amount of Si + Ti (mol%) | Hc [Oe] | SN [dB] | Summarized Evaluation |
|---|---|---|---|---|
| Comparative Example 12 | 5 | 3800 | 19.6 | X |
| Example 11 | 6 | 4630 | 20.2 | O |
| Example 12 | 8 | 4980 | 20.8 | O |
| Example 13 | 10 | 5030 | 21.3 | OOO |
| Example 14 | 11 | 4870 | 21 | OO |
| Example 15 | 12 | 4380 | 20.9 | O |
| Comparative Example 13 | 13 | 3850 | 20.6 | X |
| Comparative Example 14 | 14 | 3320 | 20.2 | X |
| Comparative Example 15 | 15 | 2910 | 20.1 | X |

| Requirements | 4000 [Oe] or more | |

|  | Hc | KuV/KT |
|---|---|---|
| CoCrPt-TiO$_2$ | 4982 | 142 |
| CoCrPt-SiO$_2$-TiO$_2$ | 5013 | 105 |

| | B[mol%]<br>A[mol%] | Hc [Oe] | SNR[dB] | Summarized Evaluation |
|---|---|---|---|---|
| Comparative Example 23 | 6<br>6 | 3380 | 16.8 | × |
| Example 21 | 10<br>6 | 4890 | 19 | ○ |
| Example 22 | 12<br>6 | 4340 | 18.3 | ○ |
| Comparative Example 24 | 6<br>10 | 3150 | 17 | × |
| Comparative Example 25 | 10<br>10 | 3830 | 17.3 | × |
| Example 23 | 12<br>10 | 3220 | 16.9 | × |
| Comparative Example 26 | 6<br>12 | 2860 | 16.7 | × |
| Comparative Example 27 | 10<br>12 | 3530 | 17.2 | × |
| Comparative Example 28 | 12<br>12 | 3130 | 16.5 | × |

| | Film Arrangement of Recording Layers | Hc | SNm | OW | Summarized Evaluation |
|---|---|---|---|---|---|
| Example 24 | Si+Ti / Cr | 4967 | 20.2 | -31.2 | ○ |
| Example 25 | Si+Ti / Cr+Si | 5038 | 21.3 | -31.6 | ○○ |
| Example 26 | Si+Ti / Si+Ti | 4867 | 21.4 | -33.7 | ○○ |
| Example 27 | Si+Ti / Cr+Ti | 5128 | 21.6 | -30.2 | ○○ |
| Comparative Example 29 | Si+Ti | 4687 | 19.8 | -38.7 | △ |
| Comparative Example 30 | Y+Si | 3061 | 19.4 | -48.3 | X |

| Requirements | 4000[Oe] or more | | -30[dB] or less | |

| | Example 43 | Example 44 | Example 45 | Example 46 | Comparative-Example 41 | Comparative-Example 42 | Comparative-Example 43 | Comparative-Example 44 | Requirements |
|---|---|---|---|---|---|---|---|---|---|
| Oxide in 2nd Magnetic Recording Layer Y(+α) | Si | SiTi | SiTi | SiTi | Si | SiTi | Ti | Ti | |
| Oxide in 1st Magnetic Recording Layer X+Y | SiCr | SiCr | SiTi | SiCr | SiTi | Cr | Cr | Cr | |
| Oxide in Size-Reduction Promoting Layer X | Cr | Si | Si | Cr | Cr | Si | Si | Ta2O5 | |
| Magnetic Coercive Force Hc [Oe] | 5100 | 5040 | 4867 | 4910 | 4830 | 4970 | 4680 | 4830 | 4000[Oe] or more |
| SNR [dB] | 21.0 | 21.3 | 21.4 | 20.9 | 20.3 | 20.4 | 19.8 | 20.1 | −30[dB] or more |
| Evaluation | ○ | ◎ | ◎ | ○ | △ | △ | △ | △ | |

FIG. 16

PERPENDICULAR MAGNETIC RECORDING MEDIUM

CROSS REFERENCE TO RELATED APPLICATIONS

This application is a National Stage of International Application No. PCT/JP2008/067555 filed Sep. 26, 2009, claiming priority based on Japanese Patent Application Nos. 2007-256911, 2007-256912, 2007-256913, filed Sep. 28, 2007 and 2008-088117, 2008-088118 and 2008-088119 filed Mar. 28, 2008, the contents of all of which are incorporated herein by reference in their entirety.

TECHNICAL FIELD

The present invention relates to a perpendicular magnetic recording medium mounted on a perpendicular magnetic recording type HDD (hard disk drive) or the like.

BACKGROUND ART

Various information recording techniques have been developed along with recent increase of capacity in information processing. Particularly, the areal recording density of HDDs using a magnetic recording technique has continued to increase at an annual rate of about 100%. Recently, a 2.5-inch perpendicular magnetic recording medium used for an HDD or the like has been required to have an information storage capacity greater than 160 GB per disk. In order to meet such a demand, it is necessary to achieve an information recording density greater than 250 Gbit/inch$^2$.

In recent years, perpendicular magnetic recording media of perpendicular magnetic recording type have been proposed in order to achieve a higher recording density of a magnetic recording medium used for an HDD or the like. In a perpendicular magnetic recording type, an axis of easy magnetization in a magnetic recording layer is arranged so as to be oriented in a direction perpendicular to a surface of a substrate. The perpendicular magnetic recording type is suitable to increase the recording density because it can suppress heat fluctuation phenomena as compared to a conventional longitudinal magnetic recording type.

As a magnetic recording medium of perpendicular magnetic recording type, a CoCrPt—SiO$_2$ perpendicular magnetic recording medium has been proposed because it exhibits high thermal stability and excellent recording characteristics (see Non-patent Document 1). A granular structure in which non-magnetic grain boundary portions are formed between magnetic grains that have grown continuously in a columnar shape is formed in a magnetic recording layer, thereby reducing the size of the magnetic grains and improving a magnetic coercive force Hc. It has been known that an oxide is used for non-magnetic grain boundaries (non-magnetic portions between magnetic grains). For example, there has been proposed to use one of SiO$_2$, Cr$_2$O$_3$, TiO, TiO$_2$, and Ta$_2$O$_5$ (Patent Document 1).

Furthermore, a size-reduction promoting layer having a non-magnetic granular structure (also referred to as an onset layer in some cases) in which SiO$_2$ is segregated at grain boundaries of a non-magnetic metal of CoCr may be provided below a magnetic recording layer (Patent Document 2). The size-reduction promoting layer is deposited on a Ru underlayer, which is a continuous crystal that is not isolated. Therefore, when a granular layer is to be formed on a Ru layer, segregation is not necessarily completed at an initial stage. The crystal orientation of bases of the granular columns is disordered, and the bases of the granular columns spread laterally such that they are coupled to each other. The disorder of the crystal orientation causes decrease of the SNR or the magnetic coercive force Hc. The coupling of the crystal grains also causes decrease of the SNR. In this regard, the size-reduction promoting layer allows the bases of the granular portions to be formed of non-magnetic substance and thus serves to promote segregation and isolation of the granular portions (magnetic grains) in the magnetic recording layer even if the bases of granular portions have been coupled to each other.

Non-patent Document 1: T. Oikawa et al., IEEE Trans. Magn, vol. 38, 1976-1978 (2002)
Patent Document 1: JP-A-2006-024346
Patent Document 2: JP-A-2006-268972

DISCLOSURE OF INVENTION

Problem(s) to be Solved by the Invention

Magnetic recording media have been increased in recording density as described above. Further improvement in recording density has been demanded. Important elements for a higher recording density include various factors such as improvement of the magnetic coercive force Hc, the over-write performance, improvement of the SNR (Signal-Noise Ratio), and reduction of the track width. Improvement of the SNR, which is important among others, is achieved mainly by noise reduction of a magnetic transition region in a magnetic recording layer. Noise reduction requires improvement in crystal orientation of the magnetic recording layer, reduction of the grain diameter of magnetic grains, and isolation of the magnetic grains. Specifically, for increasing the recording density of a medium, it is desired to uniformize and reduce the grain diameter of magnetic grains and also to maintain a segregation state in which individual magnetic grains are magnetically decoupled.

Furthermore, improvement of the magnetic coercive force Hc is achieved by optimization of the materials or the crystal orientation of a magnetic layer and an underlayer, the film arrangement, and the like. Improvement of the SNR is achieved mainly by noise reduction of a magnetic transition region in a magnetic recording layer. In order to improve both of the magnetic coercive force Hc and the SNR, it is desirable to uniformize and reduce the grain diameter of magnetic grains and also to maintain a segregation state in which individual magnetic grains are magnetically decoupled.

Meanwhile, a Co-based perpendicular magnetic recording layer, particularly a CoPt-based perpendicular magnetic recording layer, is suitable because it has a high magnetic coercive force (Hc) and can reduce a reversed domain nucleation magnetic field (Hn) to be a small value less than zero so as to improve resistance to heat fluctuation and to have a high SNR. If an element such as Cr is contained in the perpendicular magnetic recording layer, Cr can be segregated at grain boundary portions of magnetic grains. Therefore, magnetic grains can be isolated such that the exchange interaction is blocked. Thus, the Co-based perpendicular magnetic recording layer is conducive to increase of the recording density.

Furthermore, in the aforementioned CoCrPt—SiO$_2$ perpendicular magnetic recording medium, addition of an oxide such as SiO$_2$ allows the oxide to be segregated at grain boundaries without inhibiting epitaxial growth of CoPt. Therefore, the SNR (Signal-Noise Ratio) can be improved by reducing the size of magnetic grains and promoting isolation between the magnetic grains.

Various materials for oxides have been examined. Furthermore, provision of two or more magnetic recording layers has been studied to simultaneously achieve high magnetic coercive force Hc and SNR, overwrite performance, and the like.

Reduction in size of magnetic grains and isolation of magnetic grains are influenced by the thickness of an oxide in the horizontal direction (longitudinal direction) that has been segregated at grain boundaries. If the amount of oxide is increased, the SNR is improved at a high recording density. If the amount of oxide is excessively increased, the perpendicular magnetic anisotropy is deteriorated, resulting in problems of degradation in thermal stability and increase of noise. In other words, while it is effective to contain an oxide at grain boundaries, the amount of oxide that can be contained has a limitation. Thus, limits are put on reduction in size and improvement of isolation.

An object of the present invention is to provide a perpendicular magnetic recording medium capable of further increasing a recording density by increasing magnetostatic characteristics (the magnetic coercive force Hc in particular) and increasing electromagnetic conversion characteristics (the SNR in particular).

Means to Solve the Problem(s)

For the purpose of size reduction and isolation of magnetic grains, the inventors have examined oxides that form grain boundaries. The inventors have attracted attention to the fact that effects of an oxide differ depending not only upon the amount of the oxide, but also upon the kind of the oxide. The inventors have diligently studied effects depending upon the kind of an oxide and have found that $SiO_2$ tends to promote size reduction of magnetic grains and that $TiO_2$ tends to improve electromagnetic conversion characteristics (the SNR in particular).

Thus, different kinds of oxides have different characteristics. An appropriate oxide can be selected for desired performance. However, those characteristics have both advantages and disadvantages. Any oxide does not necessarily meet demands for future increase in recording density.

The inventors have examined whether to simultaneously exhibit characteristics of a plurality of oxides and have found that those characteristics can be obtained without cancellation by properly using a plurality of oxides.

Conventionally, a Ru underlayer has been provided for improving the crystal orientation of magnetic grains in a magnetic recording layer. Furthermore, a size-reduction promoting layer has been provided for eliminating influence of crystal growth at an initial stage. All of these assume that Co crystal grains epitaxially grow in a columnar shape from hcp crystals of Ru.

In contrast thereto, the inventors have attracted attention to the fact that, when crystal grains grow through a plurality of layers including a size-reduction promoting layer, a first magnetic recording layer, and a second magnetic recording layer, they do not necessarily grow in a one-to-one relationship on the interfaces. Specifically, for example, if one column rises on two columns when an upper layer is deposited with a combination of new materials after movement to a next chamber, then isolation and size reduction of crystal grains become insufficient even though a granular structure has satisfactorily been formed in a lower layer.

Therefore, the inventors have found that crystal grains can grow in a one-to-one relationship with continuous growth of grain boundaries in addition to continuous growth of the crystal grains. Meanwhile, appropriate kinds of oxides that meet required functions should be selected for the size-reduction promoting layer, the first magnetic recording layer, and the second magnetic recording layer. The inventors have found that segregation and isolation of magnetic grains can further be promoted if grain boundaries can be made continuous even though different oxides are used and thus have completed the present invention.

A typical configuration of a perpendicular magnetic recording medium according to the present invention is a perpendicular magnetic recording medium having a magnetic recording layer with a granular structure in which non-magnetic grain boundary portions are formed between magnetic grains that have grown continuously in a columnar shape. It is characterized that the grain boundary portions contain a plurality of kinds of oxides.

With the above configuration, it is possible to obtain a perpendicular magnetic recording medium that can have characteristics of a plurality of oxides, can reduce noise by further size reduction and isolation of magnetic grains in a magnetic recording layer, and can increase the recording density by improvement of the SNR.

The plurality of kinds of oxides may include both of $SiO_2$ and $TiO_2$. $SiO_2$ has characteristics of promoting size reduction and isolation of magnetic grains, and $TiO_2$ has characteristics of improving electromagnetic conversion characteristics (the SNR in particular). Those oxides are segregated in a composite manner at the grain boundaries of the magnetic recording layer. Thus, advantages of both oxides can be attained.

The content of all of the plurality of kinds of oxides is preferably in a range of from 6 mol % to 12 mol %. Within the aforementioned range, advantages can be more than those of each single oxide of the contained oxides. Therefore, high magnetic coercive force and SNR can be obtained.

When a plurality of magnetic recording layers having a granular structure are provided, a plurality of kinds of oxides may be contained at grain boundary portions of at least one of the magnetic recording layers. Furthermore, two or more of the plurality of magnetic recording layers or all of them may contain a plurality of kinds of oxides.

Another typical configuration of the perpendicular magnetic recording medium according to the present invention is a perpendicular magnetic recording medium having at least a first magnetic recording layer and a second magnetic recording layer on a substrate in an order named. The first magnetic recording layer and the second magnetic recording layer are a ferromagnetic layer having a granular structure in which non-magnetic grain boundary portions are formed between magnetic grains that have grown continuously in a columnar shape. The grain boundary portions of the first magnetic recording layer and the second magnetic recording layer contain a plurality of kinds of oxides.

With the above configuration, it is possible to obtain a perpendicular magnetic recording medium that can have characteristics of a plurality of oxides, can increase magnetostatic characteristics (the magnetic coercive force Hc in particular) by further size reduction and isolation of magnetic grains in a magnetic recording layer, and can increase the recording density by improvement of electromagnetic conversion characteristics (the SNR in particular).

Preferably, A<B where the content of all of the plurality of kinds of oxides contained in the first magnetic recording layer is defined by A mol %, and the content of all of the plurality of kinds of oxides contained in the second magnetic recording layer is defined by B mol %. This configuration can improve the OW performance with maintaining the magnetic coercive force Hc and a high SNR.

The content of all of the plurality of kinds of oxides contained in the first magnetic recording layer or the second magnetic recording layer is preferably in a range of from 6 mol % to 12 mol %. Within the aforementioned range, advantages can be more than those of each single oxide of the contained oxides.

The plurality of kinds of oxides can be selected from among $SiO_2$, $TiO_2$, $CrO_2$, $Cr_2O_3$, $ZrO_2$, and $Ta_2O_5$. The oxides may be a substance that can form grain boundary portions around magnetic grains so as to suppress or block the exchange interaction between the magnetic grains. Particularly, it is preferable to contain both $SiO_2$ and $TiO_2$. For the first magnetic recording layer, it is preferable to use one of combinations including $Cr_2O_3+SiO_2$, $Cr_2O_3+TiO_2$, and $SiO_2+TiO_2$. $SiO_2$ has characteristics of promoting size reduction and isolation of magnetic grains, and $TiO_2$ has characteristics of improving electromagnetic conversion characteristics (the SNR in particular). Those oxides are segregated in a composite manner at the grain boundaries of the magnetic recording layer. Thus, advantages of both oxides can be attained.

Preferably, the content of all of the plurality of kinds of oxides contained in the first magnetic recording layer is in a range of from 5 mol % to 8 mol %, and A<B where the content of all of the plurality of kinds of oxides contained in the first magnetic recording layer is defined by A mol %, and the content of all of the plurality of kinds of oxides contained in the second magnetic recording layer is defined by B mol %.

The magnetic coercive force Hc tends to decrease when the content of all oxides in the first magnetic recording layer is excessively large or is excessively small. Within the aforementioned range, a high magnetic coercive force Hc can be obtained. Within the aforementioned range, the magnetic coercive force Hc has the maximum value when the content of all oxides in the second magnetic recording layer is 10 mol %.

Still another typical configuration of a perpendicular magnetic recording medium according to the present invention has at least: a size-reduction promoting layer having a granular structure in which grain boundary portions containing a first oxide are formed between non-magnetic grains that have grown continuously in a columnar shape and reducing a size of magnetic grains of a magnetic recording layer; a first magnetic recording layer having a granular structure in which grain boundary portions containing the first oxide and a second oxide are formed between magnetic grains that have grown continuously in a columnar shape; and a second magnetic recording layer having a granular structure in which grain boundary portions containing the second oxide are formed between magnetic grains that have grown continuously in a columnar shape, on a substrate in an order named.

With the above configuration, since both of oxides contained in the size-reduction promoting layer and the second magnetic recording layer are added to the first magnetic recording layer, the affinity between grain boundaries on each interface can be enhanced. Therefore, not only crystal grains, but also grain boundaries can grow continuously, so that segregation and isolation of magnetic grains in the second magnetic recording layer as a primary recording layer can further be promoted. Accordingly, electromagnetic conversion characteristics (the SNR in particular) can be increased.

The first oxide or the second oxide may be selected from among $SiO_2$, $TiO_2$, $CrO_2$, $Cr_2O_3$, $ZrO_2$, and $Ta_2O_5$. The oxides may be a substance that can form grain boundary portions around magnetic grains so as to suppress or block the exchange interaction between the magnetic grains.

Particularly, the first oxide may be $SiO_2$, and the second oxide may be $TiO_2$. It is preferable to use $SiO_2$ for the size-reduction promoting layer because $SiO_2$ promotes size reduction. It is preferable to use $TiO_2$ for the second magnetic recording layer because a high SNR can be obtained.

Effect(s) of the Invention

According to a perpendicular magnetic recording medium of the present invention, the recording density can further be increased by increasing magnetostatic characteristics (the magnetic coercive force Hc in particular) and increasing electromagnetic conversion characteristics (the SNR in particular).

BRIEF DESCRIPTION OF DRAWINGS

FIG. 16 is a table showing the magnetic coercive force Hc, the SNR, and the summarized evaluation in a case where the composition of non-magnetic substance was varied.

Figure 1:
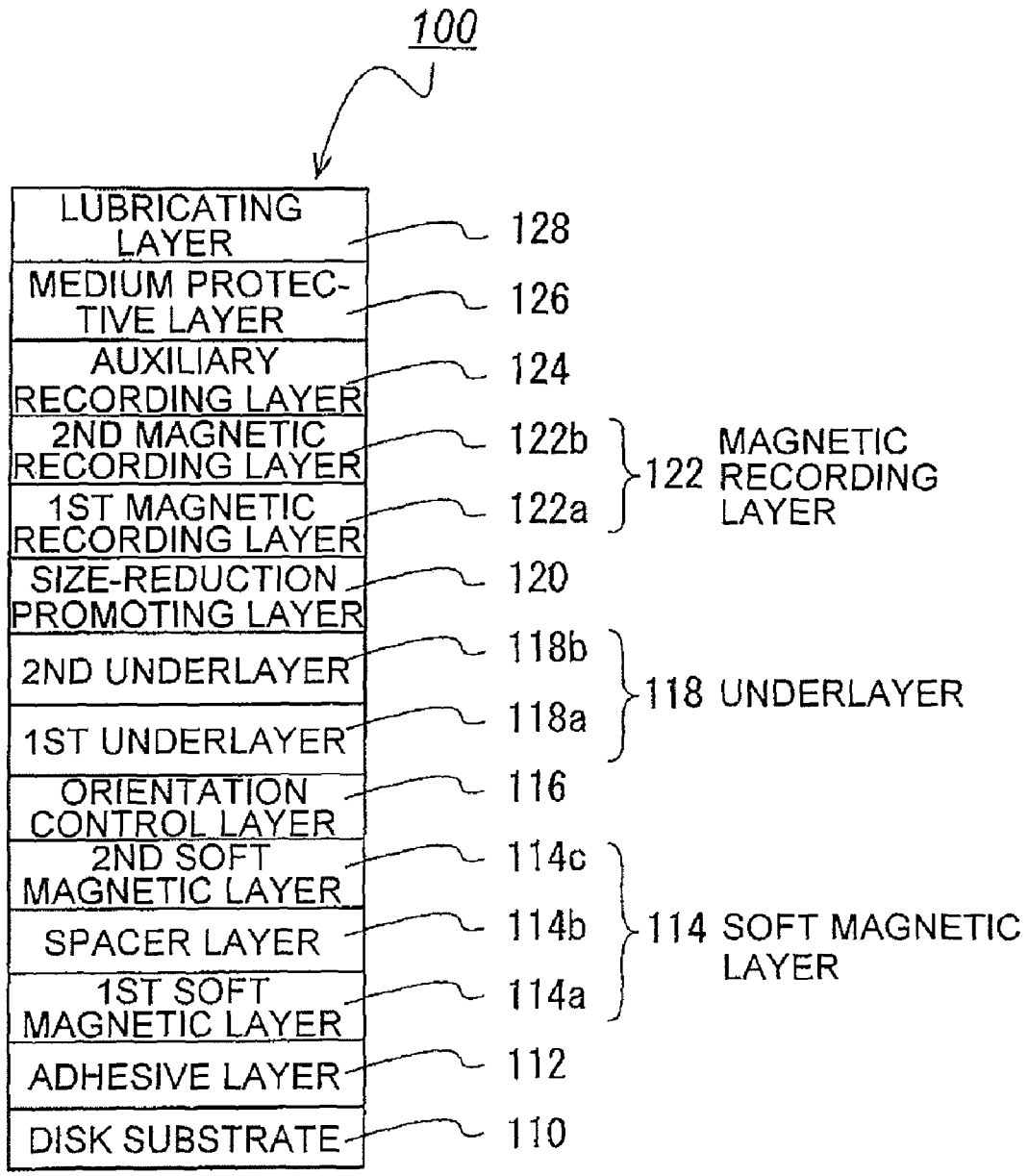
FIG. 1 is a diagram explanatory of an arrangement of a perpendicular magnetic recording medium according to a first embodiment.

DESCRIPTION OF REFERENCE NUMERALS 100, 102, 104, 106 . . . perpendicular magnetic recording medium
110 . . . disk substrate
112 . . . adhesive layer
114 . . . soft magnetic layer
114a . . . first soft magnetic layer
114b . . . spacer layer
114c . . . second soft magnetic layer
116 . . . orientation control layer
118 . . . underlayer
118a . . . first underlayer
118b . . . second underlayer
120 . . . size-reduction promoting layer
122 . . . magnetic recording layer
122a . . . first magnetic recording layer
122b . . . second magnetic recording layer
123 . . . magnetic recording layer formed of a single layer
124 . . . auxiliary recording layer
126 . . . medium protective layer
128 . . . lubricating layer

BEST MODE FOR CARRYING OUT THE INVENTION

First Embodiment

A first embodiment of a method of manufacturing a perpendicular magnetic recording medium according to the present invention will be described below. The size, materials, and other specific values described in the following embodiments are mere examples for better understanding the present invention and do not limit the present invention unless otherwise explained.

FIG. 1 is a diagram explanatory of an arrangement of a perpendicular magnetic recording medium 100 according to the embodiment. The perpendicular magnetic recording medium 100 shown in FIG. 1 has a disk substrate 110, an adhesive layer 112, a first soft magnetic layer 114a, a spacer layer 114b, a second soft magnetic layer 114c, an orientation control layer 116, a first underlayer 118a, a second underlayer 118b, a size-reduction promoting layer 120, a first magnetic recording layer 122a, a second magnetic recording layer 122b, an auxiliary recording layer 124, a medium protective layer 126, and a lubricating layer 128. The first soft magnetic layer 114a, the spacer layer 114b, and the second soft magnetic layer 114c jointly form a soft magnetic layer 114. The first underlayer 118a and the second underlayer 118b jointly form an underlayer 118. The first magnetic recording layer 122a and the second magnetic recording layer 122b jointly form a magnetic recording layer 122.

As described below, according to the perpendicular magnetic recording medium 100 illustrated in the present embodiment, because a plurality of kinds of oxides (hereinafter referred to as a composite oxide) are contained in either one or both of the first magnetic recording layer 122a and the second magnetic recording layer 122b of the magnetic recording layer 122, the composite oxide is segregated at non-magnetic grain boundaries.

A glass disk into which an amorphous aluminosilicate glass is formed by direct pressing may be used as the disk substrate 110. The kind, size, thickness, and the like of the glass substrate are not specifically limited. Examples of materials for the glass substrate include aluminosilicate glass, soda lime glass, soda aluminosilicate glass, aluminoborosilicate glass, borosilicate glass, quartz glass, chain silicate glass, and glass ceramic such as crystallized glass. This glass disk is sequentially subjected to grinding, polishing, and chemical strengthening so as to provide a non-magnetic smooth disk substrate 10 formed of a chemically strengthened glass disk.

Layers from the adhesive layer 112 to the auxiliary recording layer 124 can be sequentially deposited on the disk substrate 110 by a DC magnetron sputtering method. The medium protective layer 126 can be deposited by a CVD method. Then the lubricating layer 128 can be formed by a dip coating method. It is preferable to use an in-line deposition method from the viewpoint of high productivity. The composition of each layer and a method of manufacturing each layer will be described below.

The adhesive layer 112 is an amorphous underlayer and is formed in contact with the disk substrate 110. The adhesive layer 112 has a function of increasing the peel strength of the soft magnetic layer 114 deposited on the adhesive layer 112 and the disk substrate 110 and a function of reducing the size of crystal grains in each of the layers deposited on the adhesive layer 112 and uniformizing the crystal grains. In a case where the disk substrate 110 is formed of amorphous glass, it is preferable to form the adhesive layer 112 of an amorphous alloy film so as to conform to a surface of the amorphous glass.

For example, the adhesive layer 112 can be selected from among a CrTi-based amorphous layer, a CoW-based amorphous layer, a CrW-based amorphous layer, a CrTa-based amorphous layer, and a CrNb-based amorphous layer. Among others, the CoW-based alloy film is preferable because it forms an amorphous metal film containing microcrystals. The adhesive layer 112 may include a single layer formed of a single material. Nevertheless, the adhesive layer 112 may be formed by stacking a plurality of layers. For example, a CoW layer or a CrW layer may be formed on a CrTi layer. It is preferable to sputter a material including carbon dioxide, carbon monoxide, nitrogen, or oxygen on the adhesive layer 112 or to expose a surface layer of the adhesive layer 112 to a gas including carbon dioxide, carbon monoxide, nitrogen, or oxygen.

The soft magnetic layer 114 is a layer for forming a magnetic path temporarily at the time of recording in order to pass a magnetic flux through the recording layer in a perpendicular direction according to the perpendicular magnetic recording method. The soft magnetic layer 114 can be configured to have AFC (antiferro-magnetic exchange coupling) with interposing the non-magnetic spacer layer 114b between the first soft magnetic layer 114a and the second soft magnetic layer 114c. Thus, the magnetization direction of the soft magnetic layer 114 can be aligned along the magnetic path (magnetic circuit) with high accuracy. Therefore, a component perpendicular to the magnetization direction becomes extremely small. Accordingly, noise produced from the soft magnetic layer 114 can be reduced. A cobalt-based alloy such as CoTaZr, a Co—Fe-based alloy such as CoCrFeB, or a Ni—Fe-based alloy such as a multilayer structure of [Ni—Fe/Sn]n may be used for the first soft magnetic layer 114a and the second soft magnetic layer 114c.

The orientation control layer 116 is a non-magnetic alloy layer. The orientation control layer 116 has a function of protecting the soft magnetic layer 114 and a function of orienting an axis of easy magnetization of a hexagonal close-packed structure (hcp structure) contained in the underlayer 118, which is deposited on the orientation control layer 116, toward a direction perpendicular to the disk. It is preferable to arrange the orientation control layer 116 such that the (111) surface of the face-centered cubic structure (fcc structure) or the (110) surface of the body-centered cubic structure (bcc structure) is parallel to the principal surface of the disk substrate 110. The orientation control layer 116 may be arranged to mix those crystal structures and amorphous substance. A material of the orientation control layer may be selected from among Ni, Cu, Pt, Pd, Zr, Hf, Nb, and Ta. Furthermore, the orientation control layer may be an alloy containing such a metal as a principal component and one or more additional elements of Ti, V, Ta, Cr, Mo, and W. For example, NiW, CuW, or CuCr may suitably be selected for the fcc structure, and Ta may suitably be selected for the bcc structure.

The underlayer 118 has an hcp structure. The underlayer 118 has a function of allowing Co crystals of the magnetic recording layer 122 having an hcp structure to grow into a granular structure. Therefore, the orientation of the magnetic recording layer 122 can further be improved as the underlayer 18 has a higher crystal orientation, i.e., the (0001) surface of the crystals in the underlayer 118 is more parallel to the principal surface of the disk substrate 110. A typical material of the underlayer is Ru. Additionally, the material of the underlayer can be selected from RuCr and RuCo. Ru has an hcp structure and also has lattice intervals of crystals that are close to those of Co. Therefore, Ru can favorably orient a magnetic recording layer containing Co as a principal component.

In the case where the underlayer 118 is formed of Ru, a double layer structure of Ru can be formed by changing a gas pressure during sputtering. Specifically, when the second underlayer 118b on an upper side of the underlayer 118 is to be formed, a gas pressure of Ar is changed so as to be higher than that for formation of the first underlayer 118a on a lower side of the underlayer 118. If a gas pressure is increased, free movement paths of sputtered plasma ions are shortened. Therefore, a deposition rate is lowered, so that the crystal orientation can be improved. Furthermore, a high pressure reduces the size of the crystal lattice. Since the crystal lattice of Ru is larger in size than that of Co, the crystal lattice of Ru can be brought close to the crystal lattice of Co if the crystal lattice of Ru is reduced. Thus, the crystal orientation of the Co granular layer can further be improved.

The size-reduction promoting layer 120 is a non-magnetic granular layer. The size-reduction promoting layer 120 has a function of segregating a magnetic granular layer at an initial growth stage (starting) by forming a non-magnetic granular layer on the underlayer 118 having an hcp crystal structure and allowing a granular layer of the first magnetic recording layer 122a to grow thereon. The size-reduction promoting layer 120 can be formed so as to have a granular structure by segregating non-magnetic substance between non-magnetic crystal grains of Co-based alloy for forming grain boundaries. Particularly, CoCr—$SiO_2$ and CoCrRu—$SiO_2$ can suitably be used. Furthermore, Rh (rhodium), Pd (palladium), Ag (silver), Os (osmium), Ir (iridium), or Au (gold) may be used instead of Ru. The non-magnetic substance is a substance that can form grain boundary portions around magnetic grains so as to suppress or block the exchange interaction between the magnetic grains and is a non-magnetic substance that is not dissolved into cobalt (Co) in a solid state. Examples of the non-magnetic substance include silicon oxide ($SiO_x$), chromium (Cr), chromium oxide ($CrO_2$), titanium oxide ($TiO_2$), zirconium oxide ($ZrO_2$), and tantalum oxide ($Ta_2O_5$).

The magnetic recording layer 122 has a granular column structure in which non-magnetic substance is segregated around magnetic grains of a hard magnetic material selected from among Co-based alloy, Fe-based alloy, and Ni-based alloy so as to from grain boundaries. Provision of the size-reduction promoting layer 120 allows the magnetic grains to epitaxially grow continuously from the granular structure of the size-reduction promoting layer 120. The magnetic recording layer may be formed of a single layer. However, in the present embodiment, the magnetic recording layer is formed of the first magnetic recording layer 122a and the second magnetic recording layer 122b, which have different compositions and film thicknesses. The first magnetic recording layer 122a and the second magnetic recording layer 122b can suitably use, as the non-magnetic substance, an oxide such as $SiO_2$, $Cr_2O_3$, $TiO_2$, $B_2O_3$, or $Fe_2O_3$, a nitride such as BN, or a carbide such as $B_4C_3$.

Furthermore, in the present embodiment, two or more non-magnetic substances are used in a composite manner in either one or both of the first magnetic recording layer 122a and the second magnetic recording layer 122b. At that time, types of the non-magnetic substances to be included are not limited. Particularly, it is preferable to include $SiO_2$ and $TiO_2$. Instead of or in addition to any of those, $Cr_2O_3$ can suitably be used. For example, the first magnetic recording layer 122a may contain $Cr_2O_3$ and $SiO_2$ as a composite oxide (a plurality of kinds of oxides) at grain boundary portions, thereby forming an hcp crystal structure of CoCrPt—$Cr_2O_3$—$SiO_2$. For example, the second magnetic recording layer 122b may contain $SiO_2$ and $TiO_2$ as a composite oxide at grain boundary portions, thereby forming an hcp crystal structure of CoCrPt—$SiO_2$—$TiO_2$.

The auxiliary recording layer 124 is a layer formed on the magnetic recording layer 122 having a granular structure so as to be magnetically continuous in a longitudinal direction (also referred to as a continuous layer). The auxiliary recording layer 124 is not necessarily required. However, the auxiliary recording layer 124 provides improvement of a reversed domain nucleation magnetic field Hn, improvement of heat fluctuation resistance characteristics, and improvement of the overwrite performance in addition to high-density recording to the magnetic recording layer 122 and noise reduction.

The auxiliary recording layer 124 may not be formed of a single layer and may have a CGC structure (Coupled Granular Continuous), which forms a thin film (continuous layer) that exhibits high perpendicular magnetic anisotropy and high saturation magnetization MS. The CGC structure can be formed of a magnetic recording layer having a granular structure, a coupling control layer including a thin film of non-magnetic substance such as Pd or Pt, and an exchange energy control layer of an alternate stacked layer in which thin films of CoB and Pd are stacked.

The medium protective layer 126 can be formed by depositing carbon by a CVD method while a vacuum is maintained. The medium protective layer 126 is a protective layer for protecting the perpendicular magnetic recording layer against impact from a magnetic head. Generally, carbon deposited by a CVD method is improved in film hardness as compared to carbon deposited by a sputtering method. Therefore, the medium protective layer 126 can protect the perpendicular magnetic recording layer more effectively against impact from a magnetic head.

The lubricating layer 128 can be formed of PFPE (perfluoropolyether) by a dip coating method. PFPE has a molecular structure of a long chain and is coupled to N atoms on a surface of the medium protective layer 126 with high affinity. The lubricating layer 128 serves to prevent damage or defect of the medium protective layer 126 even if a magnetic head is brought into contact with a surface of the perpendicular magnetic recording medium 100.

The perpendicular magnetic recording medium 100 is obtained by the above manufacturing process. The effectiveness of the present invention will be described below with reference to some examples and comparative examples.

Evaluation

Layers from the adhesive layer 112 to the auxiliary recording layer 124 were sequentially formed on the disk substrate 110 under an Ar atmosphere with an evacuated deposition apparatus by a DC magnetron sputtering method. The adhesive layer 112 was formed of CrTi. The first soft magnetic layer 114a and the second soft magnetic layer 114c of the soft magnetic layer 114 were formed of CoCrFeB, and the spacer layer 114b was formed of Ru. The orientation control layer 116 was formed of a NiW alloy having an fcc structure. In the underlayer 118, Ru was deposited under high-pressure Ar for the first underlayer 118a, and Ru was deposited under low-pressure Ar for the second underlayer 118b. The size-reduction promoting layer 120 was formed of non-magnetic CoCr—$SiO_2$. The magnetic recording layer 122 was formed with the following configurations of Examples and Comparative Examples. The auxiliary recording layer 124 was formed of CoCrPtB. The medium protective layer 126 was deposited with use of $C_2H_4$ and CN by a CVD method. The lubricating layer 128 was formed with use of PFPE by a dip coating method.

Figure 2:
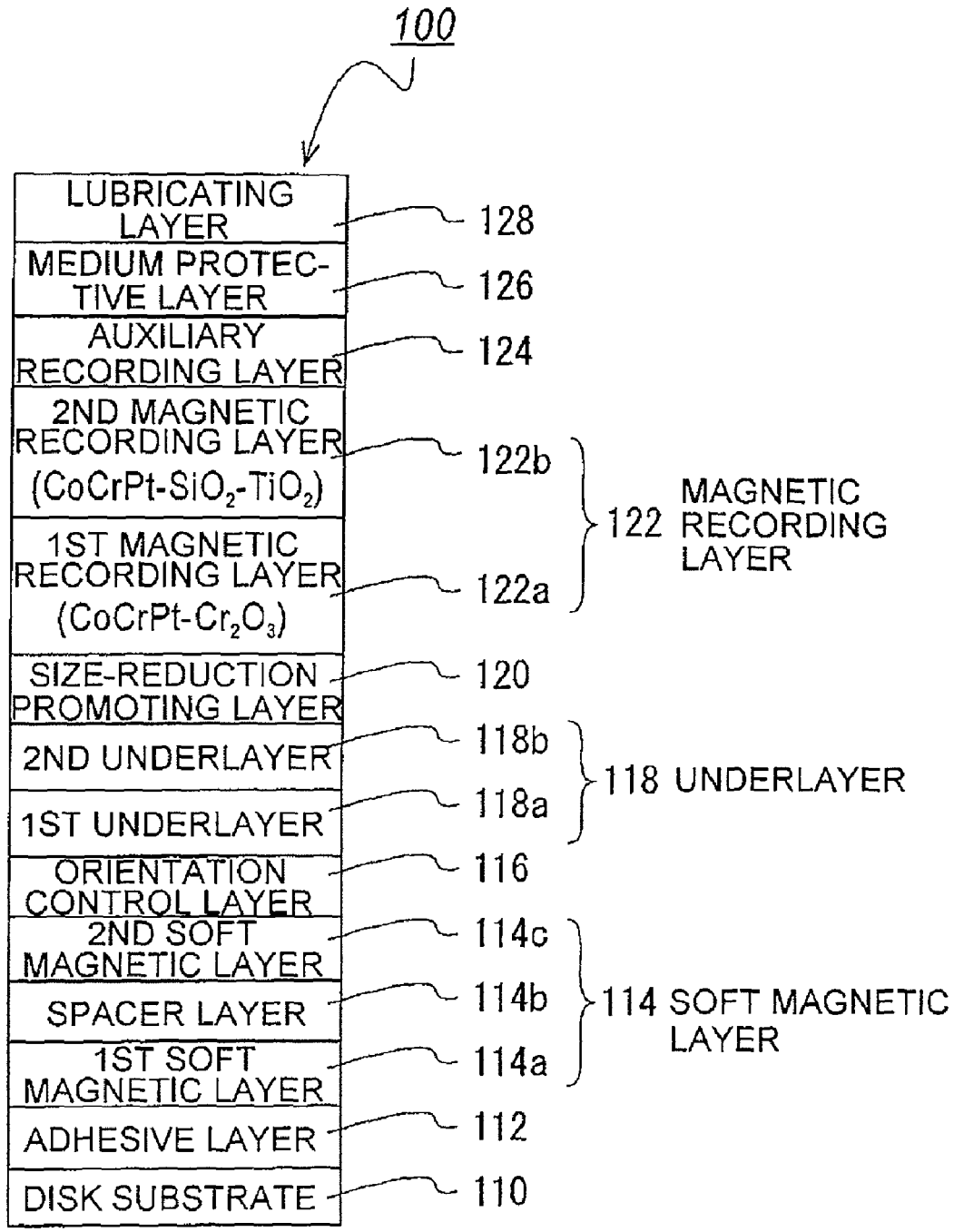
FIG. 2 is a diagram showing an example of an arrangement of the perpendicular magnetic recording medium according to the first embodiment.

FIG. 2 is a diagram showing an example of an arrangement of the perpendicular magnetic recording medium 100 according to the first embodiment. As shown in FIG. 2, the grain boundary portions of CoCrPt in the second magnetic recording layer 122b of the present embodiment was formed of a composite oxide including $SiO_2$ and $TiO_2$.

Figures 3, 4:
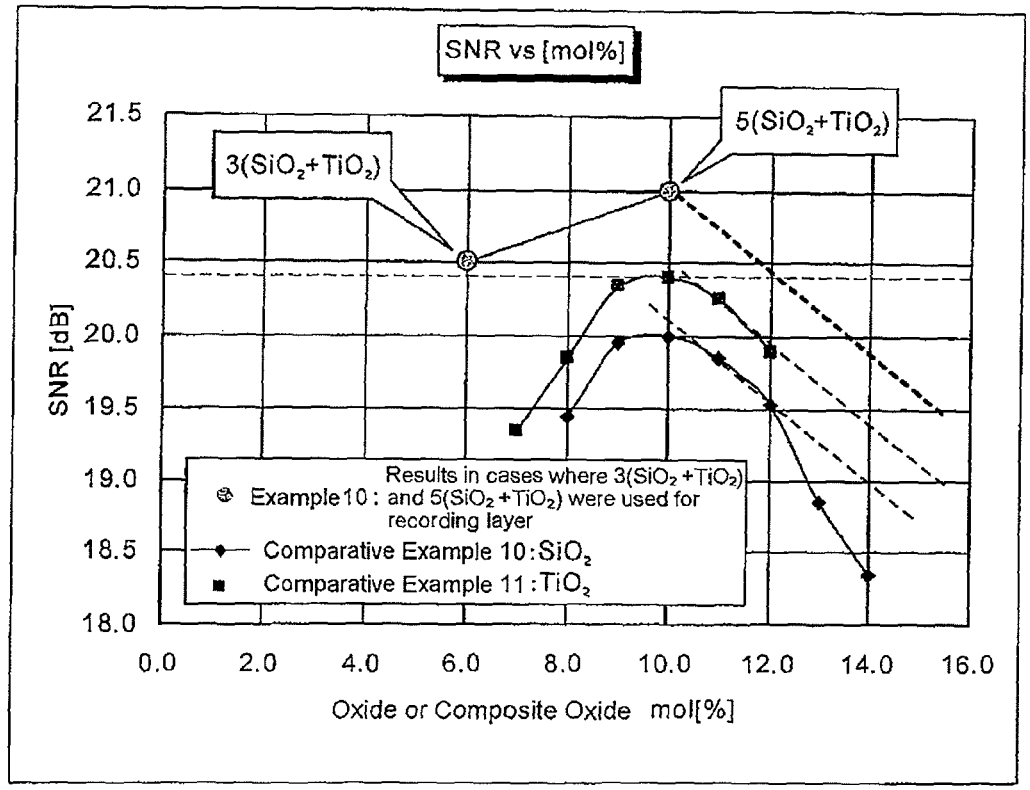
FIG. 3 is a graph showing relationship between a mixture ratio of an oxide or a composite oxide and an SNR in Example and Comparative Examples.
FIG. 4 is a table showing the SNR and the magnetic coercive force Hc in a case where the content of a composite oxide was varied as a whole.

FIG. 3 is a graph showing relationship between a mixture ratio of an oxide or a composite oxide and an SNR in Example and Comparative Examples. In Example 10 as described in the above embodiment, the first magnetic recording layer 122a contained $Cr_2O_3$ as an oxide, and the second magnetic recording layer 122b contained $SiO_2$ and $TiO_2$ as a composite oxide at 3 mol % and 5 mol %, respectively. In Comparative Example 10, the second magnetic recording layer 122b contained $SiO_2$ as an oxide. In Comparative Example 11, the second magnetic recording layer 122b contained $TiO_2$ as an oxide. Since data of Example 10 have a small number of plotted points, they were extrapolated from slopes of lines of Comparative Examples 10 and 11, which are respectively shown by broken lines, on the assumption that Example 10 has a similar tendency to Comparative Examples 10 and 11.

As can be seen from FIG. 3, Comparative Example 11 ($TiO_2$) had a better result of the SNR than Comparative Example 10 ($SiO_2$). A difference between $SiO_2$ and $TiO_2$ has been known in that $TiO_2$ produces larger magnetic grains. Generally, the SNR becomes worse if magnetic grains become larger. However, it is conceivable that the case of $TiO_2$ exhibited a better SNR than $SiO_2$ because tendency of uniformization of magnetic grains exceeds the decrease of the SNR.

Example 10 using a composite oxide had a better result of the SNR than Comparative Examples 10 and 11. It is conceivable that $SiO_2$ effectively provided isolation, that $TiO_2$ effectively increased the size of magnetic grains, and that both of $SiO_2$ and $TiO_2$ contributed to improvement of the SNR.

Referring to FIG. 3, when the content of the composite oxide was in a range of from 6 mol % to 12 mol % as a whole, electromagnetic conversion characteristics were better than those of Comparative Example 11. Specifically, it can be seen that, when the content of the composite oxide was within the aforementioned range, characteristics were better than characteristics of each one of the oxides forming the composite oxide. Thus, the aforementioned range is a preferable range for the content of the composite oxide.

FIG. 4 is a table showing the SNR and the magnetic coercive force Hc in a case where the content of the composite oxide was varied as a whole. Here, the contents of $SiO_2$ and $TiO_2$ were the same. (For example, when the total amount was 10 mol %, the content of each of $SiO_2$ and $TiO_2$ was 5 mol %.) The content of the composite oxide in Examples and Comparative Examples were 3 mol % in Comparative Example 12, 6 mol % to 12 mol % in Examples 11 to 15, and 13 mol % to 15 mol % in Comparative Examples 13 to 15.

As can be seen from FIG. 4, when the total amount of the composite oxide was increased, the SNR increased and had the maximum value at 10 mol %. When the total amount of the composite oxide was further increased, the SNR gradually decreased. The magnetic coercive force Hc exhibited a similar tendency. When the total amount of composite oxide was increased, the magnetic coercive force increased and had the maximum value at 10 mol %. When the total amount of the composite oxide was further increased, the magnetic coercive force gradually decreased.

Meanwhile, as a required value of the parameter, the magnetic coercive force Hc needs to be at least 4000 [Oe] from the viewpoint of increase in recording density (reduction in track width) and heat fluctuation resistance. Therefore, Comparative Examples 12 to 15 do not meet the requirement. Accordingly, it can be seen that the content should not be less than 6 mol % (Example 11) or should not be more than 12 mol % (Example 15). If the SNR is high within limited ranges of the magnetic coercive force Hc and the OW performance, an HDD having a high recording density can be produced. Thus, it can be seen that the total amount of oxides that meets the above requirements is in a range of from 6 mol % to 12 mol %.

Figures 5, 6:
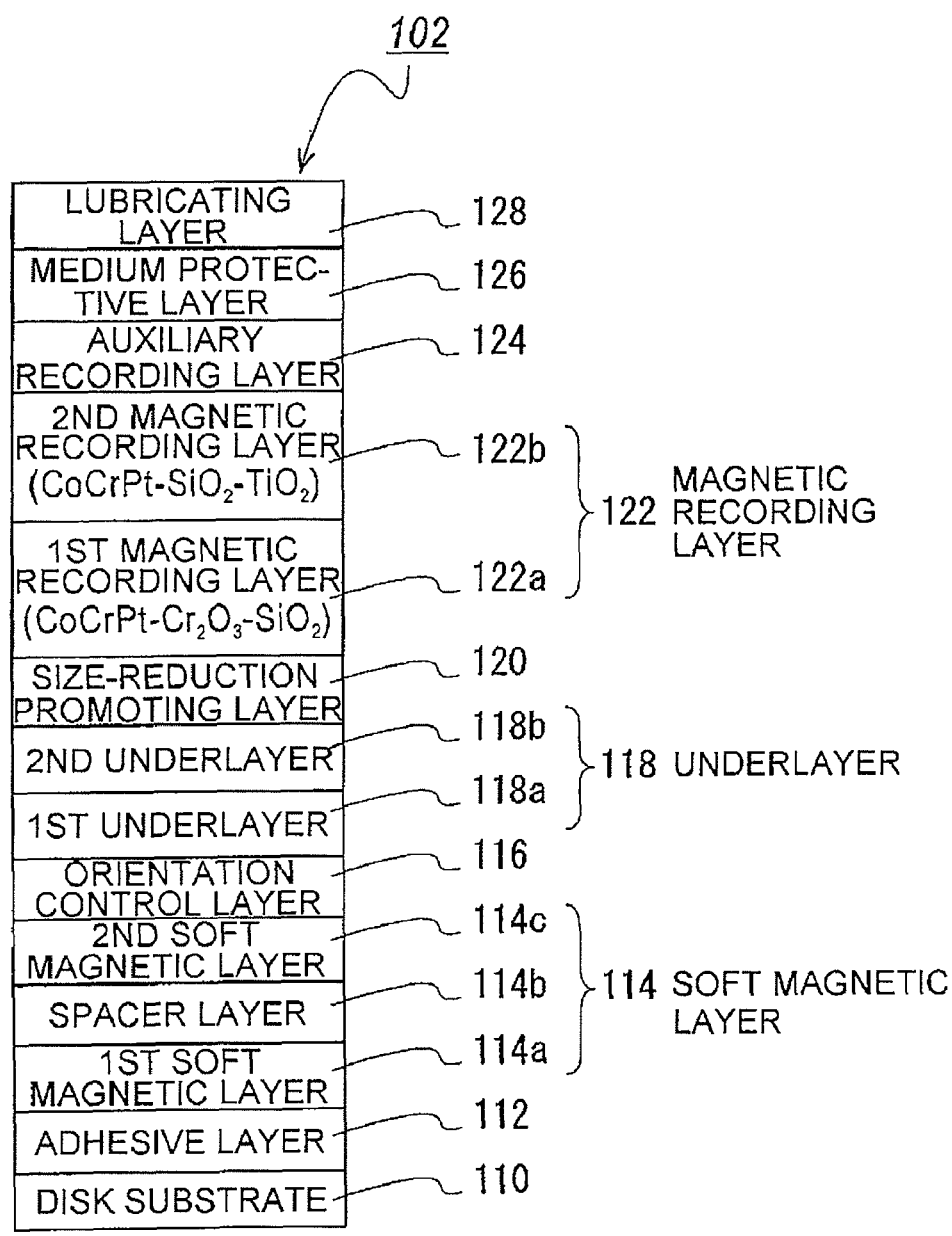
FIG. 5 is a table showing evaluation results of heat fluctuation characteristics of CoCrPt—$TiO_2$ (single oxide) and CoCrPt—$SiO_2$—$TiO_2$ (composite oxide).
FIG. 6 is a diagram showing an example of an arrangement of a perpendicular magnetic recording medium according to a second embodiment.

FIG. 5 shows evaluation results of heat fluctuation characteristics of CoCrPt—$TiO_2$ (single oxide) and CoCrPt—$SiO_2$—$TiO_2$ (composite oxide). Generally, heat fluctuation characteristics are important factors to improve the SNR. The heat fluctuation characteristics can be represented by the index of KuV/KT where Ku is a magnetic anisotropy energy specific to a material, V is a volume of magnetic grains, K is the Boltzmann constant, and T is a temperature. In the experiments of FIG. 5, CoCrPt—$TiO_2$ and CoCrPt—$SiO_2$—$TiO_2$ had substantially the same composition and therefore theoretically had the same values of Ku for magnetic grains. The two magnetic layers did not have any difference in Ku as Ku was a constant. The temperature at the time of measurement was a room temperature, and T was the same value. Therefore, it is conceivable that the difference of KuV/KT was based on reduction in volume of magnetic grains (decrease of V) due to magnetic isolation (size reduction) of the magnetic grains. In other words, it is conceivable that, since a composite oxide was contained as non-magnetic substance in the first magnetic recording layer 122a, the heat fluctuation characteristics of the first magnetic recording layer 122a were improved so as to improve the SNR.

The above embodiment and examples have been described in such a manner that the magnetic recording layer is formed by two layers including the first magnetic recording layer and the second magnetic recording layer or by a single layer. Nevertheless, in a case where the magnetic recording layer is formed by three or more layers, the advantages of the present invention can be obtained in the same manner as described above if a plurality of kinds of oxides are contained in at least one magnetic recording layer.

Second Embodiment

A second embodiment of a perpendicular magnetic recording medium according to the present invention will be described. FIG. 6 is a diagram showing an example of an arrangement of a perpendicular magnetic recording medium 102 according to the second embodiment. Parts that are redundant in the explanation of the first embodiment are denoted by the same reference numerals, and explanation thereof is omitted herein.

In the first embodiment, the grain boundary portions of the second magnetic recording layer 122b are formed of a composite oxide including $SiO_2$ and $TiO_2$. In the present embodiment, two or more non-magnetic substances are used in a composite manner in either one or both of the first magnetic recording layer 122a and the second magnetic recording layer 122b. Types of the non-magnetic substances to be used are not limited. Particularly, it is preferable to include $SiO_2$ and $TiO_2$. Instead of or in addition to those, $Cr_2O_3$ can suitably be used. For example, the first magnetic recording layer 122a may include $Cr_2O_3$ and $SiO_2$ as a composite oxide (a plurality of kinds of oxides) at grain boundary portions, thereby forming an hcp crystal structure of CoCrPt—$Cr_2O_3$—$SiO_2$. For example, the second magnetic recording layer 122b may include $SiO_2$ and $TiO_2$ as a composite oxide at grain boundary portions, thereby forming an hcp crystal structure of CoCrPt—$SiO_2$—$TiO_2$.

FIG. 6 illustrates that $Cr_2O_3$ and $SiO_2$ are contained in the grain boundary portions of the first magnetic recording layer 122a and that $SiO_2$ and $TiO_2$ are contained in the grain boundary portions of the second magnetic recording layer 122b. However, materials for oxides are not necessarily limited to those examples. The oxides can be selected from among $SiO_2$, $TiO_2$, $CrO_2$, $Cr_2O_3$, $ZrO_2$, and $Ta_2O_5$.

Furthermore, when the content of all kinds of oxides contained in the first magnetic recording layer 122a is defined by A mol % and the content of all kinds of oxides contained in the second magnetic recording layer 122b is defined by B mol %, then A<B.

With this configuration, a granular column structure can be formed even if a film has a small thickness. Specifically, when Co crystals epitaxially grow continuously from a granular structure of the size-reduction promoting layer 120, columnar structures can readily be formed in the first magnetic recording layer 122a, which contains less oxide, because the size of crystal grains are large in the first magnetic recording layer 122a. Fine crystal grains of the second magnetic recording layer 122b grow continuously from the crystal grains of the first magnetic recording layer 122a. Therefore, size reduction can be achieved in the second magnetic recording layer 122b, which serves as a primary recording layer. Accordingly, high crystal orientation and improvement of size reduction can be obtained even at a stage at which the film thickness is small, so that the SNR can be improved.

Furthermore, since the total amount of oxides in the second magnetic recording layer 122b is larger than that in the first magnetic recording layer 122a, the size of crystal grains of an hcp crystal structure containing Co are smaller in the second magnetic recording layer 122b. Therefore, the second magnetic recording layer 122b exhibits high overwrite performance, and the first magnetic recording layer 122a exhibits a high magnetic coercive force. Accordingly, even if a magnetic coercive force is increased in the first magnetic recording layer 122a to such a degree that a magnetic head is difficult to write, magnetic transition is initiated on the second magnetic recording layer 122b as a front layer by the writing field of the magnetic head. This magnetic transition induces magnetic transition on the first magnetic recording layer 122a, which becomes writable. When no magnetic field is applied from the magnetic head, a high magnetic coercive force is exhibited by large magnetic grains of the first magnetic recording layer 122a. Therefore, the first magnetic recording layer 122a can be made thinner. To sum up, the overwrite performance (O/W) can be improved while a high magnetic coercive force (Hc) is maintained to such a degree that the magnetic coercive force exerts no influence on heat fluctuation resistance. This also allows the magnetic recording layer 122 to be made thinner.

Evaluation

Figures 7, 8:
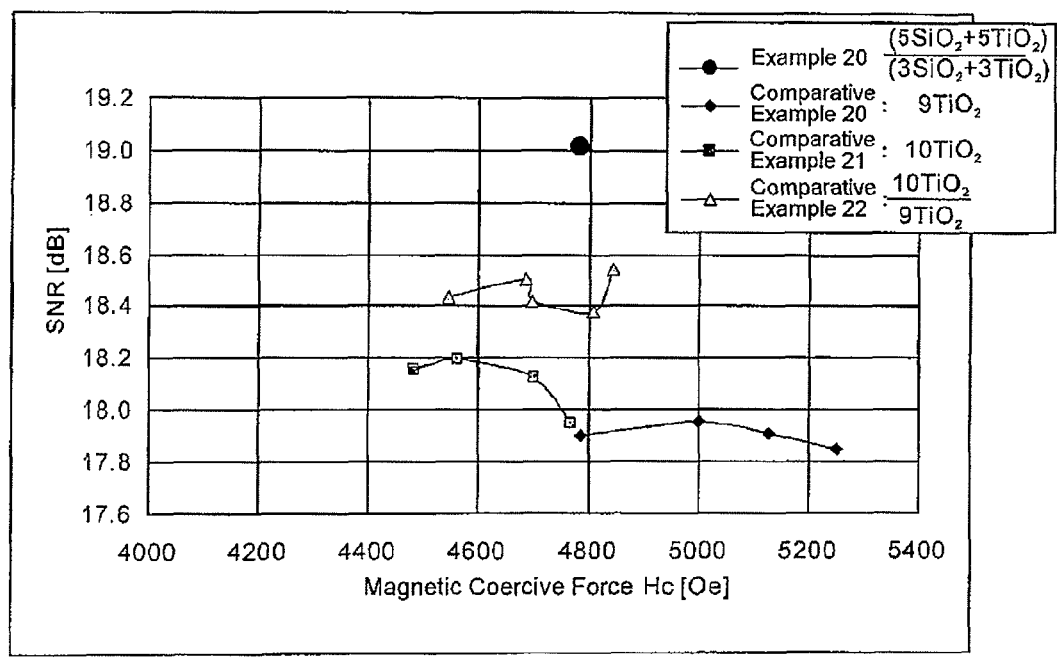
FIG. 7 is a graph showing relationship between the magnetic coercive force Hc and the SNR in Example and Comparative Examples.
FIG. 8 is a table showing the magnetic coercive force Hc and the SNR in cases where the total amounts of oxides contained in first and second magnetic recording layers 122b were varied.

FIG. 7 is a graph showing relationship between the magnetic coercive force Hc and the SNR in Example and Comparative Examples. In Example 20 as described in the above first embodiment, the first magnetic recording layer 122 contained $SiO_2$ and $TiO_2$ as a composite oxide at 3 mol %, respectively, and the second magnetic recording layer 122b contained $SiO_2$ and $TiO_2$ as a composite oxide at 5 mol %, respectively. In Comparative Example 20, the recording layer was formed of a single layer containing $TiO_2$ as an oxide at 9 mol %. In Comparative Example 21, the recording layer was formed of a single layer containing $TiO_2$ as an oxide at 10 mol %. In Comparative Example 22, the magnetic layer was formed of two layers as with Example 20, the first magnetic recording layer 122 contained $TiO_2$ at 9 mol %, and the second magnetic recording layer 122b contained $TiO_2$ at 10 mol %.

In Comparative Examples, Hc and SN were measured with varying the film thickness of the magnetic recording layer from 8 nm to 11 nm by 1 nm. In Example 20, the first magnetic recording layer 122a had a film thickness of 5 nm, and the second magnetic recording layer 122b had a film thickness of 10 nm.

As can be seen from FIG. 7, the magnetic coercive force Hc showed a tendency to increase as the film thickness was increased in all of Comparative Examples 20 to 22. It is conceivable that, when the film thickness of the magnetic recording layer 122 was increased, the length of magnetic grains that had grown into a columnar shape increased so as to reduce a demagnetizing field. As a result, the magnetic coercive force Hc was improved. Furthermore, referring to Comparative Examples 20 and 21, the SN was improved as the film thickness was increased in the case of a single recording layer. After the peak, the SN decreased. It is conceivable that the SNR was improved at an initial stage because side-writing caused by a leakage magnetic field were reduced along with improvement of the magnetic coercive force Hc. However, the magnetic coercive force Hc was excessively increased thereafter, so that the overwrite performance was deteriorated so as to decrease the SNR.

In Comparative Example 21, the magnetic coercive force Hc was lower than that of Comparative Example 20, but the SNR was improved. It is conceivable that the size of magnetic grains was reduced by increase of the amount of oxides to thereby decrease the magnetic coercive force Hc, be progressed isolation and improve the SNR.

In Comparative Example 22, the magnetic coercive force Hc was slightly improved as compared to Comparative Example 21, but the SNR was greatly improved. In Comparative Example 22, the first magnetic recording layer 122a had high crystal orientation because it contained less oxide. The size of magnetic grains in the second magnetic recording layer 122b became so small as to achieve size reduction and isolation because the second magnetic recording layer 122b contained much oxide. It is conceivable that the SNR was improved from this viewpoint.

Example 20 using a composite oxide had a magnetic coercive force Hc at the same level as Comparative Example 22.

The SNR was further improved to a large degree. It is conceivable that SiO$_2$ served for isolation and that TiO$_2$ served for increase in size of magnetic grains. Those contributed to improvement of the SNR.

Specifically, since each of the first magnetic recording layer 122a and the second magnetic recording layer 122b contains a plurality of kinds of oxides at grain boundary portions, it is possible to obtain characteristics of the plurality of oxides. Therefore, electromagnetic conversion characteristics (an SNR in particular) can be increased while magnetostatic characteristics (magnetic coercive force Hc in particular) are increased. Thus, it is possible to obtain a perpendicular magnetic recording medium capable of further increasing a recording density.

FIG. 8 is a table showing the magnetic coercive force Hc and the SNR in cases where the total amounts of oxides contained in the first and second magnetic recording layers 122b were varied. Here, the contents of SiO$_2$ and TiO$_2$ were the same. (For example, when the total amount was 10 mol %, the content of each of SiO$_2$ and TiO$_2$ was 5 mol %.) When the content of all kinds of oxides contained in the first magnetic recording layer 122a is defined by A mol % and the content of all kinds of oxides contained in the second magnetic recording layer 122b is defined by B mol %, Examples 21 to 23 show cases where A<B and Comparative Examples 23 to 28 show cases where A>B.

As can be seen from FIG. 8, when comparisons are made between examples in which compositional ratios were reversed, i.e., between Example 21 (6:10) and Comparative Example 24 (10:6) and between Example 22 (6:12) and Comparative Example 26 (12:6), the magnetic coercive force Hc and the SNR were higher in the cases where A<B.

However, when a comparison is made between Example 23 (10:12) and Comparative Example 27 (12:10), Example had a lower magnetic coercive force Hc and a lower SNR. Thus, there is a region where the aforementioned relationship is not established.

Figures 9, 10:
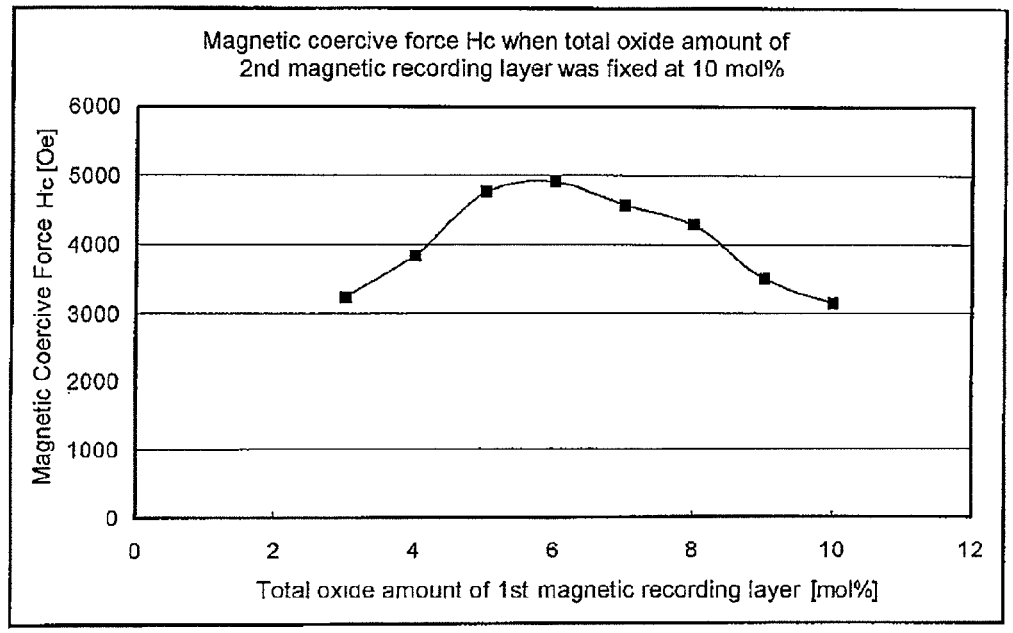
FIG. 9 is a graph showing the magnetic coercive force Hc in cases where the total amount of oxides contained in the first magnetic recording layer was varied while the amount of oxides in the second magnetic recording layer was fixed at 10 mol %.
FIG. 10 is a table showing the SNR, the magnetic coercive force Hc, and the overwrite performance when the composition of non-magnetic substance was varied.

FIG. 9 is a graph showing the magnetic coercive force Hc in cases where the total amount of oxides contained in the first magnetic recording layer 122a was varied while the amount of oxides in the second magnetic recording layer 122b was fixed at 10 mol %. Referring to FIG. 9, there is an optimum value for the amount of oxides in the first magnetic recording layer 122a. The optimum value is 6 mol %. If Hc≧4000, a preferable range is from 5 mol % to 8 mol %. In other words, good results are not necessarily obtained if A<B. An excellent SNR and magnetic coercive force Hc can be obtained when A is in a range of from 5 mol % to 8 mol % and A<B.

FIG. 10 is a table showing the SNR, the magnetic coercive force Hc, and the overwrite performance when the composition of non-magnetic substance was varied. The total amounts of the non-magnetic substance were equally 10 mol %. In FIG. 10, only oxides are shown for easy understanding.

In Example 24, the first magnetic recording layer 122a contained Cr$_2$O$_3$ as an oxide, and the second magnetic recording layer 122b contained SiO$_2$ and TiO$_2$ as a composite oxide (a plurality of kinds of oxides), thereby forming an hcp crystal structure of CoCrPt—SiO$_2$—TiO$_2$. In Example 25, the first magnetic recording layer 122a contained Cr$_2$O$_3$ and SiO$_2$ as a composite oxide, thereby forming an hcp crystal structure of CoCrPt—Cr$_2$O$_3$—SiO$_2$, and the second magnetic recording layer 122b contained SiO$_2$ and TiO$_2$ as a composite oxide. In Example 26, the first magnetic recording layer 122a contained SiO$_2$ and TiO$_2$ as a composite oxide, and the second magnetic recording layer 122b contained SiO$_2$ and TiO$_2$ as a composite oxide. In Example 27, the first magnetic recording layer 122a contained Cr$_2$O$_3$ and TiO$_2$ as a composite oxide, and the second magnetic recording layer 122b contained SiO$_2$ and TiO$_2$ as a composite oxide.

Figure 11:
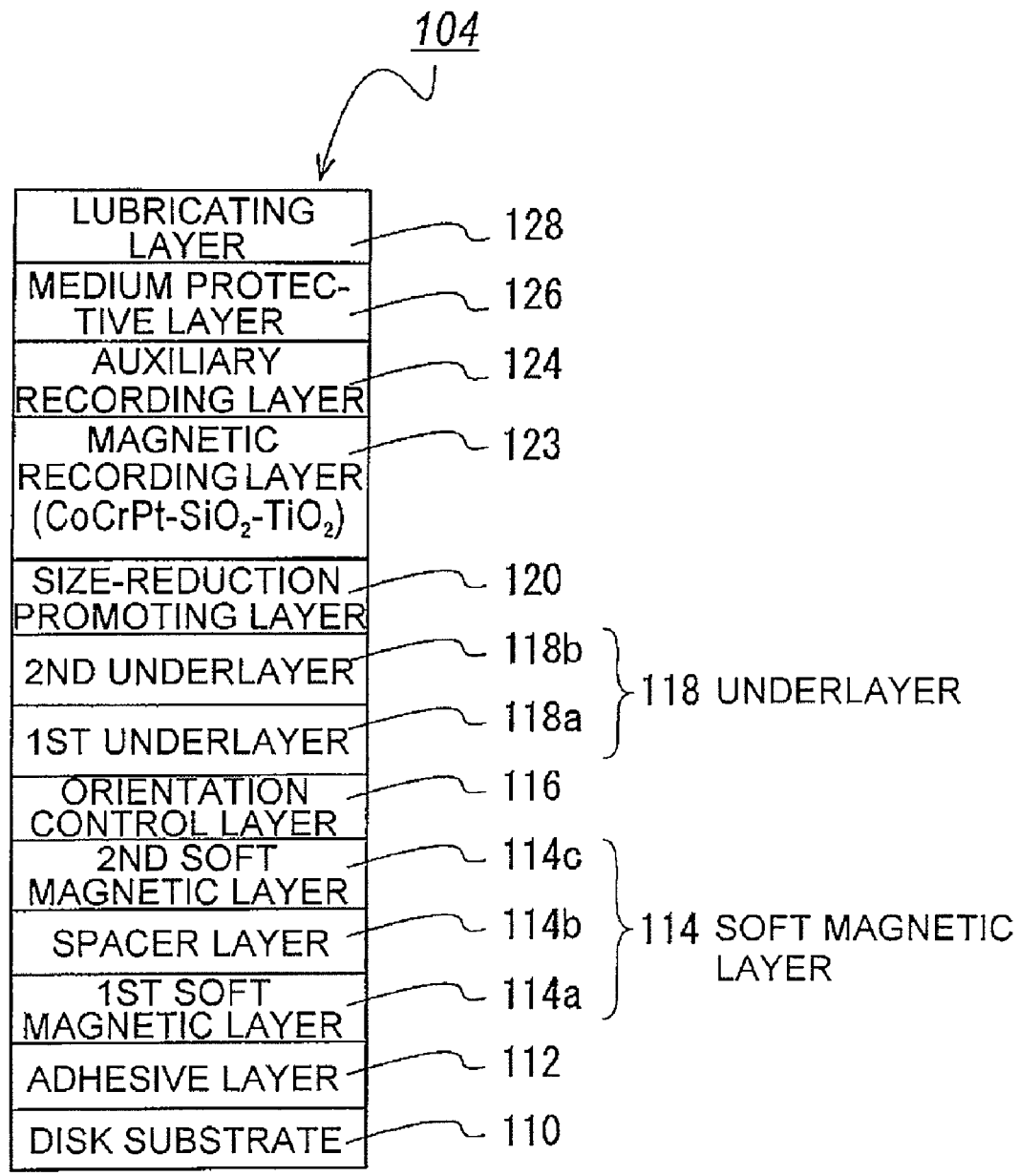
FIG. 11 is a diagram showing an arrangement in which a magnetic recording layer is formed of a single layer.

Furthermore, in Comparative Examples 29 and 30, the magnetic recording layer was formed of a single layer. FIG. 11 is a diagram showing an arrangement in which a magnetic recording layer is formed of a single layer. In a perpendicular magnetic recording medium 104 shown in FIG. 11, a magnetic recording layer 123 of a single layer is formed on the size-reduction promoting layer 120. As with the aforementioned second magnetic recording layer 122b, non-magnetic substance is segregated around magnetic substance in the magnetic recording layer 123 so as to form grain boundaries, and magnetic grains form a granular column structure. Comparative Example 29 used a composite oxide of SiO$_2$ and TiO$_2$ as oxides of the magnetic recording layer 123. Comparative Example 30 used a composite oxide of YiO$_3$ (yttrium oxide) and TiO$_2$ as oxides of the magnetic recording layer 123.

As shown in FIG. 10, in the examples where the second magnetic recording layer 122b as a primary recording layer or the magnetic recording layer 123 of a single layer contained a composite oxide of SiO$_2$ and TiO$_2$, the SNR, the magnetic coercive force Hc, and the OW performance met the requirements. However, Hc did not meet the requirements in Comparative Example 30. Therefore, it is suitable to contain, as non-magnetic substance in the magnetic recording layer, a composite oxide of SiO$_2$ and TiO$_2$, not just a composite of a plurality of oxides.

Furthermore, the SNR and the magnetic coercive force Hc were improved in Examples 24 to 26, which had a multilayer structure including a plurality of magnetic recording layers, as compared to Comparative Example 29, which had the magnetic recording layer 123 of a single layer. The track width can be reduced by improvement of the magnetic coercive force Hc. Additionally, the recording bit length can be shortened by improvement of the SNR. Therefore, it is possible to further increase the recording density. Although the reasons for improvement by both SiO$_2$ and TiO$_2$ are uncertain, it is conceivable that size reduction by SiO$_2$ and uniformization of magnetic grains by TiO$_2$ effectively cooperate with each other.

Moreover, among the configurations having a plurality of magnetic recording layers, the SNR was much improved in the case where the first magnetic recording layer 122a also contained a composite oxide as non-magnetic substance, which is preferable. Although the reasons for this improvement are uncertain, it is conceivable that the growth of magnetic grains is suppressed by use of a composite oxide.

Third Embodiment

Figures 12, 13:
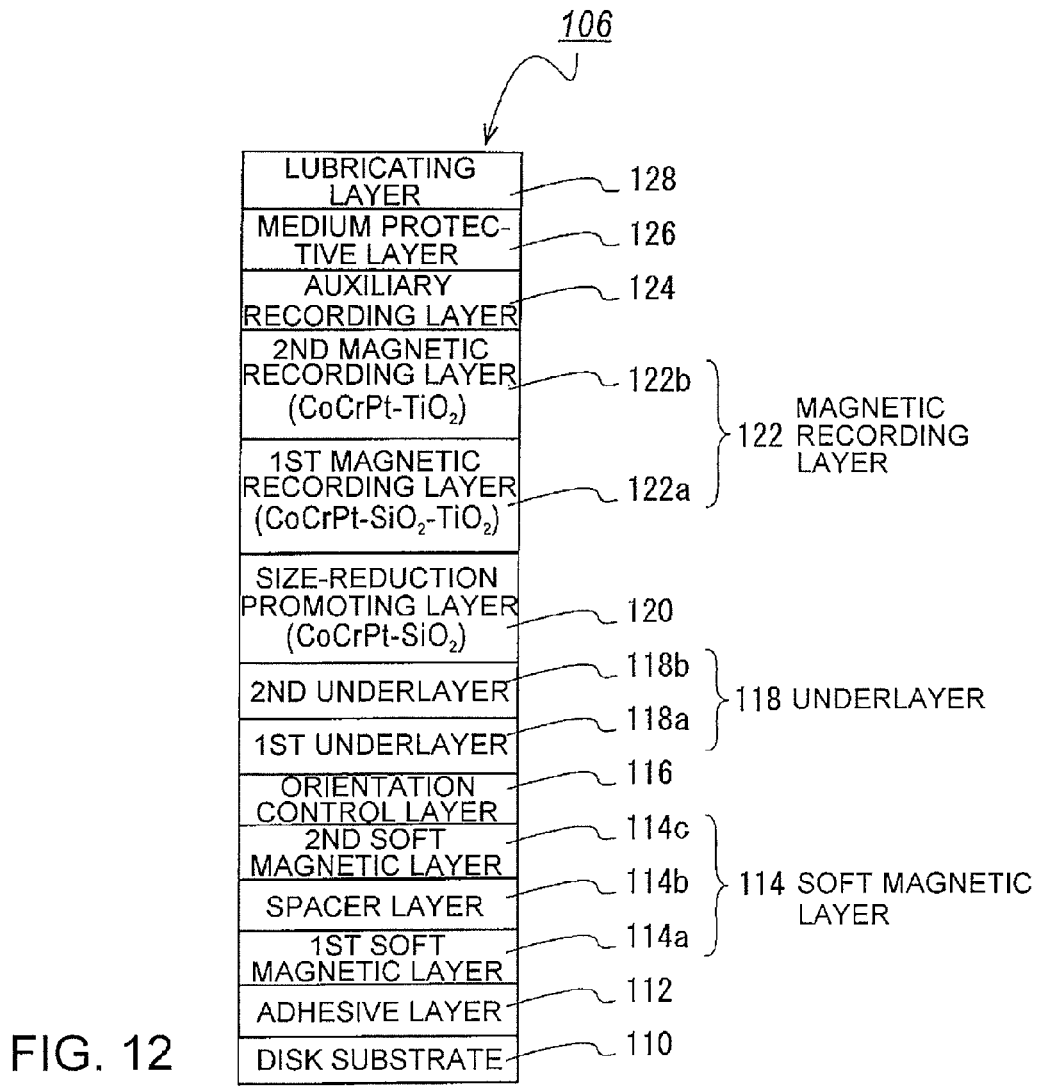
FIG. 12 is a diagram showing an example of an arrangement of a perpendicular magnetic recording medium according to a third embodiment.
FIG. 13 is a table showing the compositions of a size-reduction promoting layer, a first magnetic recording layer, and a second magnetic recording layer that have been converted from the mol %-notation to the atomic %-notation.

A third embodiment of a perpendicular magnetic recording medium according to the present invention will be described. FIG. 12 is a diagram showing an example of an arrangement of a perpendicular magnetic recording medium 106 according to the third embodiment. Parts that are redundant in the explanation of the first embodiment are denoted by the same reference numerals, and explanation thereof is omitted herein.

In the present embodiment, the size-reduction promoting layer 120 contained SiO$_2$ as a first oxide. As an example, the composition was non-magnetic, and the compositional ratio was (CoCr) 88 mol %:(SiO$_2$) 12 mol %.

The first magnetic recording layer 122a contains a plurality of kinds of oxides (hereinafter referred to as a composite oxide). Specifically, SiO$_2$ and TiO$_2$ were contained as a composite oxide (first oxide and second oxide) so as to form an hcp crystal structure. As an example of the compositional ratio, $SiO_2$ and $TiO_2$ were contained at 5 mol %, respectively so that the compositional ratio was (CoCrPt) 90 mol %:($SiO_2$) 5 mol %:($TiO_2$) 5 mol %. The film thickness of the first magnetic recording layer 122a was 5 nm. Cr, which is a non-magnetic substance, and the composite oxide were segregated around Co, which is a magnetic substance, so as to form grain boundaries. Magnetic grains formed a granular column structure. The magnetic grains epitaxially grew continuously from the granular structure of the size-reduction promoting layer.

The second magnetic recording layer 122b contained $TiO_2$ as a second oxide at 10 mol % to form an hcp crystal structure. As an example, the compositional ratio was (CoCrPt) 90 mol %:($TiO_2$) 10 mol %. The film thickness of the second magnetic recording layer 122b was 10 nm. In the second magnetic recording layer 122b, magnetic grains also formed a granular structure.

Specifically, the composition of the first magnetic recording layer 122a is CoCrPt(X+Y) where the composition of the size-reduction promoting layer 120 is CoCrX (where X is a first oxide), and the composition of the second magnetic recording layer 122b is CoCrPtY (where Y is a second oxide). Furthermore, two or more non-magnetic substances may also be used in a composite manner for the second magnetic recording layer 122b so that the composition of the second magnetic recording layer 122b is CoCrPt(Y+α). At that time, types of non-magnetic substances to be included are not limited. Particularly, it is preferable to include $SiO_2$ and $TiO_2$. Instead of or in addition to any of those, $Cr_2O_3$ can suitably be used. For example, the size-reduction promoting layer 120 may contain $Cr_2O_3$ as an oxide at grain boundary portions, the first magnetic recording layer 122a may contain $Cr_2O_3$ and $SiO_2$ as a composite oxide (a plurality of kinds of oxides) at grain boundary portions, and the second magnetic recording layer 22b may contain $SiO_2$.

FIG. 13 is a table showing the compositions of the size-reduction promoting layer, the first magnetic recording layer, and the second magnetic recording layer that have been converted from the mol %-notation to the atomic %-notation. Referring to FIG. 13, when the composition of the size-reduction promoting layer 120 is $CoCrX_1$, the composition of the second magnetic recording layer 122b is $CoCrPtY_1$, and the composition of the first magnetic recording layer 122a is $CoCrPt(X_2+Y_2)$, then there are relationships that $X_1>X_2$ and $Y_1>Y_2$.

Evaluation

Figure 14:
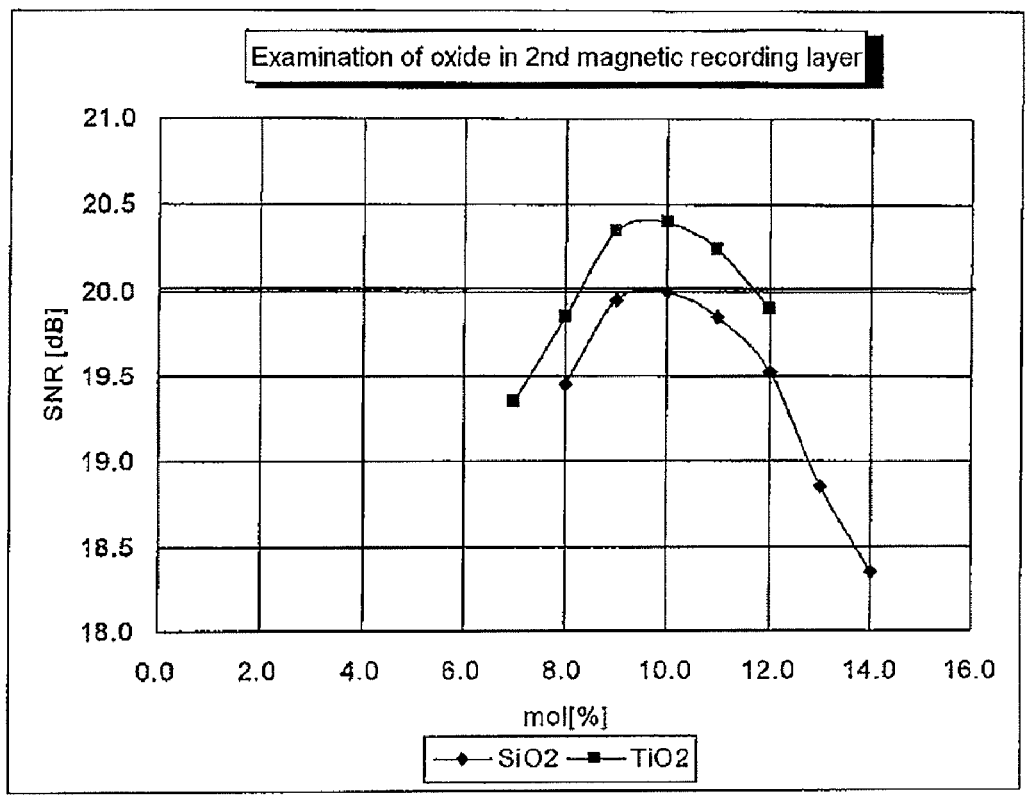
FIG. 14 is a graph showing the SNR [dB] with respect to the content of an oxide (mol %).

FIG. 14 is a graph showing the SNR [dB] with respect to the content of an oxide (mol %). Referring to FIG. 14, with regard to the content of $TiO_2$ as an oxide in the second magnetic recording layer 122b, the SNR is the highest at 10 mol %. Therefore, the amount of the oxide (Y1) in the second magnetic recording layer 122b is preferably in a range of from 8 mol % to 12 mol %. In this example, Y1 was 10 mol %.

Figure 15:
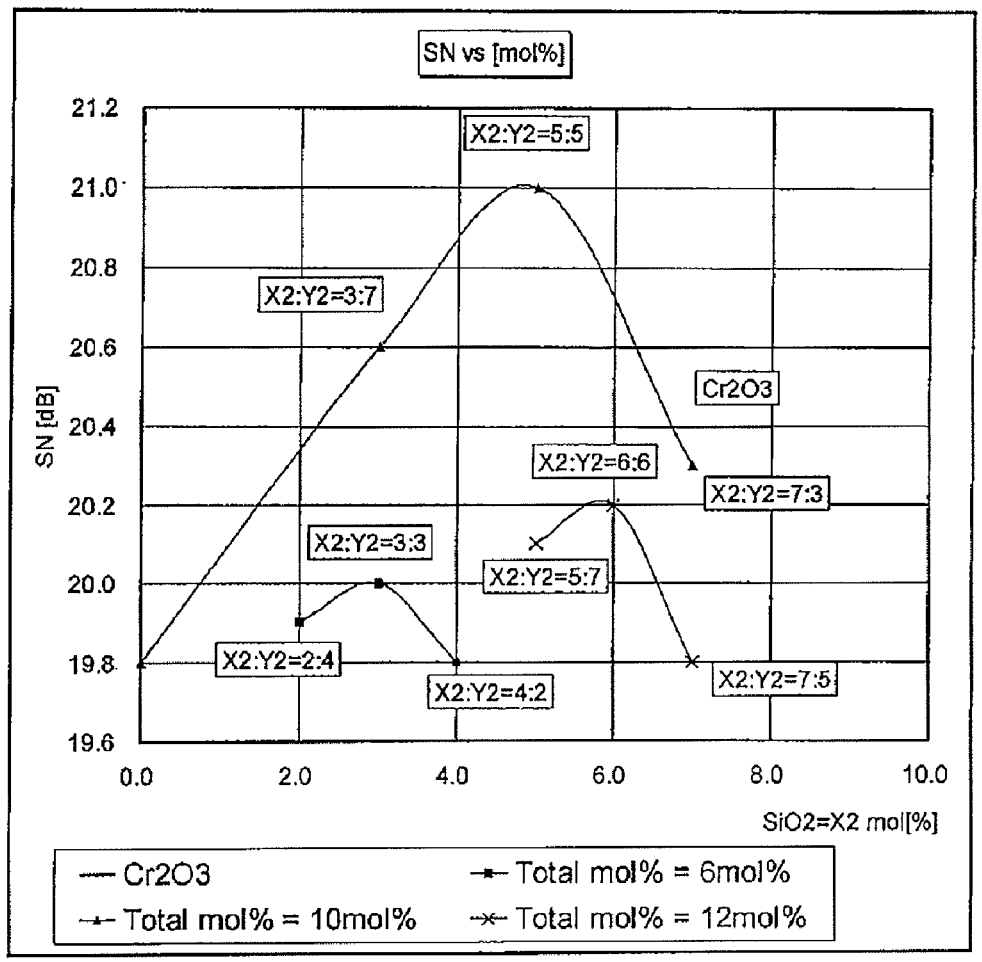
FIG. 15 is a diagram showing the SNR [dB] with respect to the contents and the ratio of X2 and Y2 in the first magnetic recording layer.

FIG. 15 is a diagram showing the SNR [dB] with respect to the contents and the ratio of X2 (the same oxide as in the size-reduction promoting layer 120) and Y2 (the same oxide as in the second magnetic recording layer 122b) in the first magnetic recording layer 122a. In FIG. 15, the total amount of oxides (hereinafter referred to as the total oxide amount) in Example 40 was 6 mol %, the total oxide amount in Example 41 was 10 mol %, and the total oxide amount in Example 42 was 12 mol %. Comparative Example 40 used CoCrPt—$Cr_2O_3$, in which $Cr_2O_3$ was included as a single oxide.

Referring to FIG. 15, in Examples 40 to 42, the SNR was the highest in the cases where the oxides X2 and Y2 were contained in the same amount. Thus, it can be seen that it is preferable to maintain a ratio of about 1:1 when two oxides are used in a composite manner.

Referring to Examples 40 to 42, the SNR was the highest in Example 41 where the total oxide amount was 10 mol %. However, the SNR decreased as compared to Comparative Example when X2 was 3 mol % or less and 7 mol % or more. Thus, it is preferable to maintain the total oxide amount at 10 mol %, to adjust X2 such that 3 mol %<X2<7 mol %, and accordingly to adjust Y2 such that 7 mol %>Y2>3 mol %.

As described above, since both of oxides (X and Y) contained in the size-reduction promoting layer 120 and the second magnetic recording layer 122b are added to the first magnetic recording layer 122a, the affinity between grain boundaries on each interface can be enhanced. Therefore, not only crystal grains, but also grain boundaries can grow continuously, so that segregation and isolation of magnetic grains in the second magnetic recording layer as a primary recording layer can further be promoted. Accordingly, electromagnetic conversion characteristics (the SNR in particular) can be increased.

Furthermore, since a plurality of kinds of oxides (the first oxide and the second oxide) are contained at grain boundary portions of the first magnetic recording layer 122a, it is possible to simultaneously obtain characteristics of a plurality of oxides. Therefore, electromagnetic conversion characteristics (the SNR in particular) can be increased while magnetostatic characteristics (the magnetic coercive force Hc in particular) are increased. Thus, it is possible to obtain a perpendicular magnetic recording medium 106 capable of further increasing the recording density.

FIG. 16 is a table showing the magnetic coercive force Hc, the SNR, and the summarized evaluation in a case where the composition of non-magnetic substance was varied. For easy understanding, only oxides are listed in FIG. 16. $SiO_2$ is abbreviated to as Si, $TiO_2$ as Ti, and $Cr_2O_3$ as Cr. In the following description, X represents an oxide contained in the size-reduction promoting layer 120 (CoCrX where X is a first oxide), and Y represents an oxide contained in the second magnetic recording layer 122b (CoCrPt(Y+α) where Y is a second oxide and a is a third oxide). The composition of the first magnetic recording layer 122a was CoCrPt(X+Y) in Examples. The composition of the first magnetic recording layer 122a did not satisfy this rule in Comparative Examples.

Example 43 included $Cr_2O_3$ as X and $SiO_2$ as Y. Example 44 included $SiO_2$ as X and $SiO_2$ as Y, so that all three layers contained $SiO_2$. Example 44 included $TiO_2$ as a for the second magnetic recording layer 122b. Example 45 also included $SiO_2$ in all three layers, and both of the first magnetic recording layer 122a and the second magnetic recording layer 122b contained $SiO_2$ and $TiO_2$. In this case, Y may be considered $SiO_2$ or $TiO_2$. Example 46 included $Cr_2O_3$ as X and $SiO_2$ as Y.

Comparative Example 41 included $Cr_2O_3$ as X and $SiO_2$ as Y. However, the first magnetic recording layer 122a was formed of $SiO_2+TiO_2$ and thus did not include X. Comparative Example 42 included $SiO_2$ as X and $SiO_2$ or $TiO_2$ as Y. However, the first magnetic recording layer 122a is formed of $Cr_2O_3$ and thus did not include X or Y. Comparative Example 43 included $SiO_2$ as X and $TiO_2$ as Y. However, the first magnetic recording layer 122a did not include X or Y. Comparative Example 44 included $Ta_2O_5$ as X and $TiO_2$ as Y. However, the first magnetic recording layer 122a did not include X or Y.

As can be seen from FIG. 16, the magnetic coercive force Hc and the SNR met the desired requirements in Examples 43 to 46 where the component of the first magnetic recording layer 122a was CoCrPt(X+Y). In contrast thereto, both of Hc and SNR were lowered in Comparative Examples 41 to 44. Particularly, the SNR did not meet the requirements. Therefore, it is suitable for the first magnetic recording layer 122a to contain, as non-magnetic substance in the magnetic recording layer, a composite oxide including both of oxides (X and Y) contained in the size-reduction promoting layer 120 and the second magnetic recording layer 122b, not just a composite of a plurality of oxides.

As described above, since both of oxides (X and Y) contained in the size-reduction promoting layer 20 and the second magnetic recording layer 22b are added to the first magnetic recording layer 22a, the affinity between grain boundaries on each interface can be enhanced. Therefore, not only crystal grains, but also grain boundaries can grow continuously, so that segregation and isolation of the first magnetic recording layer 122a can further be promoted. Accordingly, segregation and isolation of magnetic grains in the second magnetic recording layer as a primary recording layer can further be promoted.

With the aforementioned configuration, both of the magnetic coercive force Hc and the SNR can be improved. The track width can be reduced by improvement of the magnetic coercive force Hc. Additionally, the recording bit length can be shortened by improvement of the SNR. Therefore, it is possible to further increase the recording density.

Although the preferred examples of the present invention have been described with reference to the accompanying drawings, the present invention is not limited to those examples as a matter of course. It would be apparent to those skilled in the art that various changes and modifications may be made therein without departing from the spirit and scope of the claims. It should be understood that those changes and modifications are included in the scope of the present invention.

INDUSTRIAL APPLICABILITY

The present invention is applicable to a perpendicular magnetic recording medium mounted on a perpendicular magnetic recording type HDD or the like.

The invention claimed is:

1. A perpendicular magnetic recording medium having at least a first magnetic recording layer and a second magnetic recording layer on a substrate in an order named,
   wherein the first magnetic recording layer and the second magnetic recording layer are a ferromagnetic layer having a granular structure in which non-magnetic grain boundary portions are formed between magnetic grains that have grown continuously in a columnar shape,
   wherein the grain boundary portions of the first magnetic recording layer and the second magnetic recording layer contain a plurality of kinds of oxides,
   wherein A<B
   where a content of all of the plurality of kinds of oxides contained in the first magnetic recording layer is defined by A mol %, and
   a content of all of the plurality of kinds of oxides contained in the second magnetic recording layer is defined by B mol %
   wherein the first layer is a composite oxide having at least one of Ti and Si and the second layer is a composite oxide having both Si and Ti, and
   wherein the content of the composite oxide in the second layer is in the range 10 mol %-12 mol % inclusive and the content of the composite oxide in first layer is in the range of at least 6 mol %.-8 mol %.

2. A perpendicular magnetic recording medium having at least a first magnetic recording layer and a second magnetic recording layer on a substrate in an order named,
   wherein the first magnetic recording layer and the second magnetic recording layer are a ferromagnetic lager having a granular structure in which non-magnetic grain boundary portions are formed between magnetic grains that have grown continuously in a columnar shape, and the grain boundary portions of the first magnetic recording layer and the second magneticrecording layer contain a plurality of kinds of oxides,
   wherein A<B
   where the content of all of the plurality of kinds of oxides contained in the first magnetic recording layer is defined by A mol %, and
   a content of all of the plurality of kinds of oxides contained in the second magnetic recording layer is defined by B mol %,
   wherein the first layer is a composite oxide having at least one of Ti and Si and the second layer is a composite oxide having both Si and Ti, and
   wherein the content of the composite oxide in the second layer is in the range 10 mol %-12 mol % inclusive and the content of the composite oxide in first layer is in the range of 5 mol %.-8 mol %.

3. A perpendicular magnetic recording medium as recited in claim 1, further comprising:
   a size-reduction promoting layer, for reducing a size of magnetic grains of a magnetic recording layer, having a granular structure in which grain boundary portions containing a first oxide are formed between non-magnetic grains that have grown continuously in a columnar shape;
   wherein,
      the first magnetic recording layer has a granular structure in which grain boundary portions containing the first oxide and a second oxide are formed between magnetic grains that have grown continuously in a columnar shape; and
      the second magnetic recording layer having has a granular structure in which grain boundary portions containing the second oxide are formed between magnetic grains that have grown continuously in a columnar shape,
      on a substrate in an order named.

4. The perpendicular magnetic recording medium according to claim 3, wherein the first oxide is $SiO_2$, and the second oxide is $TiO_2$.

5. A perpendicular magnetic recording medium as recited in claim 2, further comprising:
   a size-reduction promoting layer, for reducing a size of magnetic grains of a magnetic recording layer, having a granular structure in which grain boundary portions containing a first oxide are formed between non-magnetic grains that have grown continuously in a columnar shape;
   wherein,
      the first magnetic recording layer has a granular structure in which grain boundary portions containing the first oxide and a second oxide are formed between magnetic grains that have grown continuously in a columnar shape; and
      the second magnetic recording layer has a granular structure in which grain boundary portions containing the second oxide are formed between magnetic grains that have grown continuously in a columnar shape, on a substrate in an order named.

* * * * *